US010482008B2

(12) United States Patent
Lee et al.

(10) Patent No.: US 10,482,008 B2
(45) Date of Patent: Nov. 19, 2019

(54) ALIGNED VARIABLE RECLAMATION

(71) Applicant: Hewlett Packard Enterprise Development LP, Houston, TX (US)

(72) Inventors: Terry Ping-Chung Lee, Antelope, CA (US); XinLai Yu, Beijing (CN); Yi Liu, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/326,322

(22) PCT Filed: Jan. 23, 2015

(86) PCT No.: PCT/CN2015/071461
§ 371 (c)(1),
(2) Date: Jan. 13, 2017

(87) PCT Pub. No.: WO2016/115737
PCT Pub. Date: Jul. 28, 2016

(65) Prior Publication Data
US 2017/0212831 A1   Jul. 27, 2017

(51) Int. Cl.
*G06F 12/02* (2006.01)
*G06F 12/0802* (2016.01)
*G06F 3/06* (2006.01)

(52) U.S. Cl.
CPC ............ *G06F 12/023* (2013.01); *G06F 3/064* (2013.01); *G06F 3/0619* (2013.01);
(Continued)

(58) Field of Classification Search
CPC ...... G06F 12/023; G06F 3/0619; G06F 3/064; G06F 3/0656; G06F 3/0673; G06F 2212/60
See application file for complete search history.

(56) References Cited

U.S. PATENT DOCUMENTS

| 4,800,520 | A | | 1/1989 | Iijima |
| 6,038,636 | A | * | 3/2000 | Brown, III .......... G06F 12/0246 711/103 |

(Continued)

FOREIGN PATENT DOCUMENTS

| CN | 1732516 A | 2/2006 |
| JP | 62-102385 A | 5/1987 |

(Continued)

OTHER PUBLICATIONS

International Searching Authority, The International Search Report and the Written Opinion, PCT/CN2013/071104, dated Jul. 25, 2013, 6 Pgs.

(Continued)

*Primary Examiner* — Mano Padmanabhan
*Assistant Examiner* — Andrew J Cheong
(74) *Attorney, Agent, or Firm* — Hewlett Packard Enterprise Patent Department

(57) ABSTRACT

In one example, reclaiming obsolete regions includes a memory organized in aligned memory blocks and storing valid variables in valid regions and obsolete variables in the obsolete regions. A memory includes a buffer region to cache the memory. A controller can search the buffer region for the obsolete regions and pair with respective valid regions and determine if start addresses of the obsolete regions are memory aligned and if not aligned, to write a small portion content of a first valid region to the start address of the aligned memory block, and to write any remaining respective valid region beginning at the start address of the aligned memory block and in multiples of the aligned memory block. Upon completion of a writing, moved respective valid regions begin at the starting address of the obsolete regions and new obsolete regions begin at end addresses of the moved respective valid regions.

18 Claims, 9 Drawing Sheets

(52) U.S. Cl.
CPC .......... *G06F 3/0656* (2013.01); *G06F 3/0673* (2013.01); *G06F 12/0802* (2013.01); *G06F 2212/60* (2013.01)

(56) References Cited

U.S. PATENT DOCUMENTS

| | | | |
|---|---|---|---|
| 6,249,793 B1 | 6/2001 | Printezis et al. | |
| 6,504,846 B1* | 1/2003 | Yu | H04L 47/15 370/395.7 |
| 6,795,890 B1 | 9/2004 | Sugai et al. | |
| 7,072,211 B2 | 7/2006 | Newell | |
| 7,299,314 B2 | 11/2007 | Lin et al. | |
| 7,451,265 B2 | 11/2008 | Traister et al. | |
| 7,809,975 B2 | 10/2010 | French et al. | |
| 8,156,303 B2 | 4/2012 | Barrall | |
| 8,260,818 B1 | 9/2012 | Polydov | |
| 8,448,034 B2 | 5/2013 | Asano | |
| 8,621,143 B2 | 12/2013 | Purdy | |
| 8,825,937 B2 | 9/2014 | Atkisson | |
| 2002/0078308 A1* | 6/2002 | Altman | G06F 12/1027 711/147 |
| 2002/0144079 A1* | 10/2002 | Willis | G06F 12/1027 711/205 |
| 2004/0141515 A1* | 7/2004 | Xiao | H04L 47/14 370/412 |
| 2005/0135367 A1* | 6/2005 | Chandra | G06F 13/1678 370/392 |
| 2005/0141313 A1* | 6/2005 | Gorobets | G06F 11/1072 365/222 |
| 2005/0204187 A1* | 9/2005 | Lee | G06F 12/0246 714/6.13 |
| 2006/0085493 A1* | 4/2006 | Kim | G06F 3/0608 |
| 2006/0112222 A1 | 5/2006 | Barrall | |
| 2006/0155920 A1* | 7/2006 | Smith | G06F 3/0616 711/103 |
| 2006/0155921 A1* | 7/2006 | Gorobets | G06F 12/0246 711/103 |
| 2006/0155922 A1* | 7/2006 | Gorobets | G06F 12/0246 711/103 |
| 2007/0214326 A1* | 9/2007 | Oka | G11C 7/1006 711/154 |
| 2009/0251476 A1* | 10/2009 | Jiao | G06F 9/383 345/543 |
| 2010/0241808 A1* | 9/2010 | Toub | G06F 12/0253 711/119 |
| 2011/0055455 A1 | 3/2011 | Post et al. | |
| 2011/0099326 A1* | 4/2011 | Jung | G06F 12/0246 711/103 |
| 2011/0145473 A1* | 6/2011 | Maheshwari | G06F 12/0866 711/103 |
| 2011/0302183 A1* | 12/2011 | Van De Vanter | G06F 9/44 707/758 |
| 2012/0191936 A1 | 7/2012 | Ebsen et al. | |
| 2012/0265924 A1 | 10/2012 | Purdy et al. | |
| 2014/0240333 A1* | 8/2014 | Shirota | G09G 5/39 345/531 |
| 2014/0258588 A1 | 9/2014 | Tomlin | |
| 2015/0067237 A1* | 3/2015 | Yoshii | G06F 12/0246 711/103 |

FOREIGN PATENT DOCUMENTS

| | | |
|---|---|---|
| JP | 08-314775 A | 11/1996 |
| JP | 3045083 | 5/2000 |
| JP | 2003-122646 A | 4/2003 |
| JP | 2006-512643 A | 4/2006 |
| JP | 2006-126919 A | 5/2006 |
| JP | 2008-191797 A | 8/2008 |
| TW | 200742977 | 11/2007 |
| TW | I292867 | 1/2008 |
| TW | I344083 | 6/2011 |
| TW | I352312 | 11/2011 |
| WO | WO-2014117328 A1 | 8/2014 |
| WO | 20161115737 A1 | 7/2016 |

OTHER PUBLICATIONS

International Searching Authority, The International Search Report and the Written Opinion, PCT/US2015/071461, dated Oct. 10, 2015, 11 Pgs.
Phoenix BIOS Developer Blog: UEFI, Feb. 2, 2007, 7 Pgs.
Umesh Maheshwari et al, "Fault-Tolerant Distributed Garbage Collection in a Client-Server Object-Oriented Database," Jul. 2, 1999, 10 Pgs.
Supplementary European Search Report and Search Opinion Received for EP Application No. 13873871.1, dated Aug. 1, 2016, 8 pages.
International Preliminary Report on Patentability received for PCT Patent Application No. PCT/CN2015/071461, dated Aug. 3, 2017, 6 pages.
International Preliminary Report on Patentability received for PCT Patent Application No. PCT/CN2013/071104, dated Aug. 13, 2015, 6 pages.

* cited by examiner

ALIGNED VARIABLE RECLAMATION

CROSS REFERENCE TO RELATED APPLICATIONS

This application is related to commonly assigned PCT Application Number PCT/CN2013/071104, filed Jan. 30, 2013 and incorporated by reference herein.

BACKGROUND

As server systems become more and more complex, the hardware and firmware used to provide additional functionality are becoming larger and are consuming both computing resources and processor clock cycles. Gone are the days of the simple BIOS which provided basic input/output system capabilities to the OS. Now there is an extensible framework interface (EFI) that allows for a type of mini operating system (OS) to reside between the BIOS and the main OS, such as Windows®, Linux®, Apple® iOS®, and others. The EFI provides a framework with an abstract interface set for transferring control to an OS or building modular firmware from one or more silicon and firmware suppliers. These abstract interfaces allow for the decoupling of the development of producer and consumer code, allowing each to innovate more independently and with faster time to market for both. The EFI also helps overcome hardware scaling limitations that the original IBM® compatible PC design assumed, allowing for much broader development across high-end enterprise servers, modem PC's and embedded devices. Lastly, EFI framework is generally "processor architecture-agnostic", as it is used to support x86, x64, ARM, and Intel Itanium processors.

One of the features of EFI is its ability to help set up the system during the boot-up process as well as provide a fail-safe and non-volatile (NV) storage for driver and system variables to allow machines that experience major crashes or other system errors to recover back to a known operating state. Nonetheless, there is always a constant force in the computing industry to continue to lower costs while increasing performance. Accordingly, improvement in the current performance and cost structure of EFI implementation is sought after.

BRIEF DESCRIPTION OF THE DRAWINGS

The claimed subject matter is better understood with reference to the following drawings. The elements of the drawings are not necessarily to scale relative to each other. Rather, emphasis has instead been placed upon clearly illustrating the claimed subject matter. Furthermore, like reference numerals designate corresponding similar parts through the several views.

DETAILED DESCRIPTION

Figure 1:
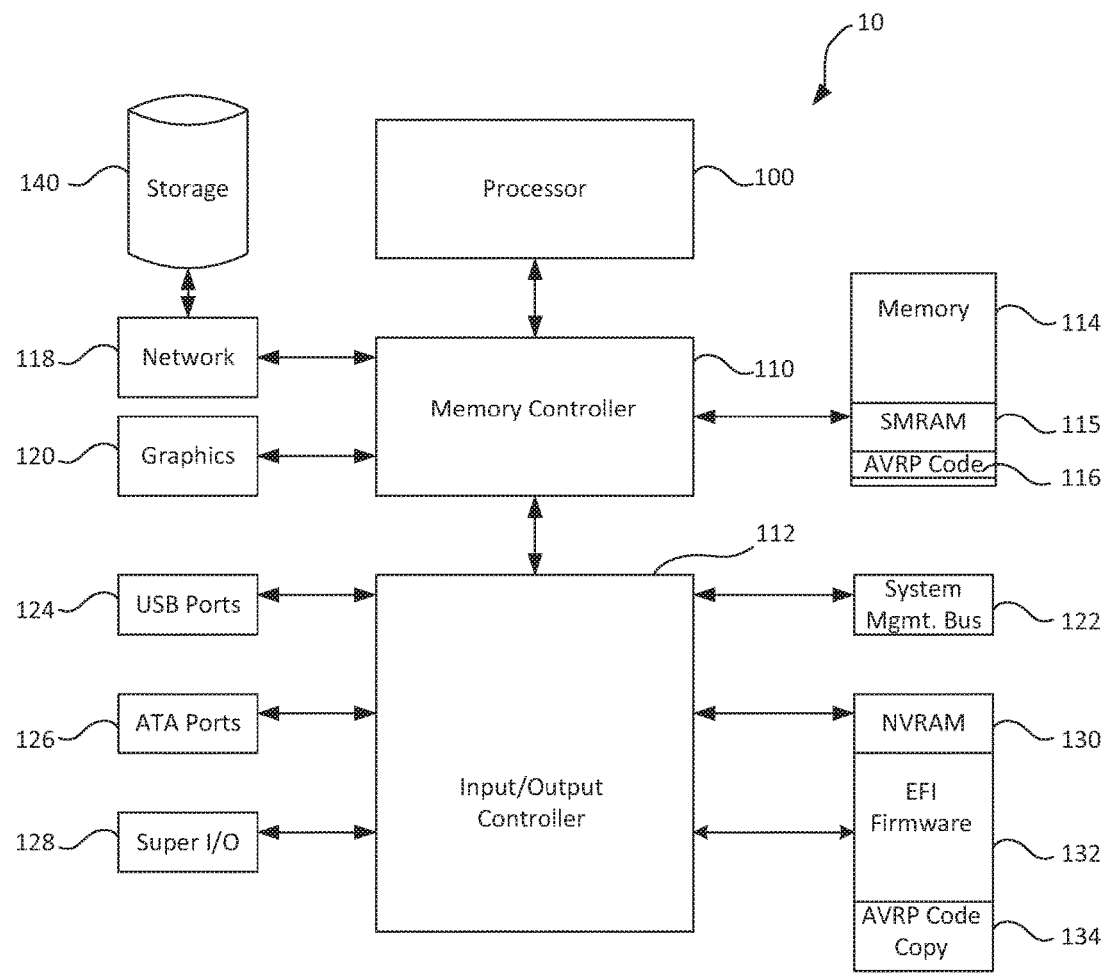
FIG. 1 is an example block diagram of a computing system implementing an EFI framework with an Aligned Variable Reclaim Process (AVRP) technique.

The inventors have increased the performance of computing platforms implementing EFI by creating a new technique that significantly reduces the amount of time required to perform fault-tolerant variable and data reclamation such as with NV memory (often referred to colloquially as "garbage collection"), such as NVRAM, without requiring the use of additional NV memory that is typical in conventional standards-based EFI implementations. This technique while described herein for use with non-volatile (NV) variables as is typical in current EFI implementations, can also be used with volatile variables for performance improvements and thus the claimed subject matter is not intended to be limited to NV variables. This performance increase via the technique is done by using system management memory (SMRAM) to shadow NVRAM and ensuring that most all NVRAM/SMRAM memory transactions are done using memory-aligned boundaries and memory-aligned sizes. Also, data borrowing, such as data padding, is done to ensure the copy size is aligned. Further, the technique described within improves the robustness of EFI-based platforms as there is less time spent in system management mode (SMM) which would take away from OS related tasks. This is particularly very useful in real-time systems that cannot afford to be delayed in their responding to real-time sensor triggers. Also, there is the potential to further reduce costs as typical enterprise servers are requiring ever larger EFI NVRAM that accordingly requires more time for routine tasks such as variable and data reclamation. The technique prevents having to redesign server systems to have a faster NVRAM data paths, thereby preventing increased production costs.

Contrarily, a reference design from the open-source EDK II implementation uses an extra NVRAM to ensure fault tolerance and do "garbage collection." During the EDK II "garbage collection"," they copy all their data first to a temporary memory buffer, then to the extra NVRAM and then to the EFI NVRAM. This approach not only requires additional NVRAM memory but is very slow thereby impacting OS performance, particularly in newer complex server designs. The inventors have alternatively created an advanced solution that reduces cost while increasing performance while being fully compatible with the existing EFI framework specifications.

For instance, EFI platforms support non-volatile (NV) EFI variable storage. These variables are stored contiguously in NVRAM. A new variable is typically stored behind the last set variable. When an existing variable is updated, a new variable is placed at the end and the existing variable is tagged as "deleted" or "obsolete". This is due to some implementations of NVRAM being implemented with FLASH memory which only allows for separate bits to be written in one direction but does allow for block-wise erasure of all bits in the block. To reclaim a space occupied by a "deleted" variable, a process often called "garbage collection" is performed, particularly when storage space is running out. There are two general requirements for implementing a "garbage collection" or aligned variable reclamation process (AVRP). First, it should be fault tolerant which means that data in the NVRAM should be recoverable when the system reboots after a system crash or other catastrophic event. Second, it should be time-efficient as "garbage collection" is typically enabled in runtime, particularly during system boot to the OS (which market forces are continually requiring be done in less and less time). The less time "garbage collection" uses, the less it will impact the OS.

In the technique within, the aligned variable reclamation process (AVRP) code traces data copying during AVRP using a Journal Record or Flash Transaction Write (FTW) Region. This Journal Record contains the details of each data copying and contains two copies of Records, called Pair1 and Pair2. These two pairs operate in a ping-pong like mechanism to allow the AVRP to be fault tolerant when a system crash occurs during AVRP operation. Further, due to the EFI variable design, there are two kinds of deleted or obsolete variable regions and their adjacent valid variable regions. A "Type1" obsolete region is non-zero and smaller in size to a following adjacent valid region. A "Type2" obsolete region is larger or equal in size to a following adjacent valid region. Each of the Type1 and Type2 obsolete regions require different approaches to ensuring that copies from the adjacent valid region to the obsolete region are done to maximize the memory boundary alignment and memory size alignment. More detail of the improved AVRP technique follows after a first description of a typical computing system used to implement the AVRP code and process.

FIG. 1 is an example computer system 10 for implementing an aligned variable reclamation process (AVRP). A processor 100 is connected to a memory controller 110 which is further connected to an Input/Output (I/O) controller 112. Memory controller 110 provides a high bandwidth and high speed interface to network 118, graphics 120, and non-transient computer readable memory 114 which may include instructions for performing tasks on processor 100, such as AVRP code 116.

Processor 100 may implement a system management mode (SMM) that provides a firmware designer with a powerful capability when system management interrupts (SMIs) are triggered during runtime. The SMM allows the system architects to provide various techniques for building software-controlled features into a system at the hardware/firmware level, making them transparent to operating system and application software. When SMM is implemented it includes the system management interrupt SMI for hardware interfacing, a dedicated and protected memory space (SMRAM 115) in memory 114 for SMI handler code, and CPU state data with a status signal (SMIACT#) for the system to decode access to the memory space, and a resume (RSM) instruction for exiting the SMM mode. The SMRAM 115 space provides a memory area that is available for SMI handlers and code and data storage including UFEI variable storage. This SMRAM 115 memory resource is protected and normally hidden from the system OS so that processor 100 has immediate access to this memory space upon entry to SMM. SMRAM 115 may also contain AVRP code 116 used for implementing the improved technique for non-volatile variable reclamation.

When the processor 100 needs to read from or write to a location in memory 114, it first checks whether a copy of that data is in one of its caches. If so, the processor 100 immediately reads from or writes to the cache, which is much faster than reading from or writing to memory 114.

Most modern desktop and server CPUs have at least three independent caches: an instruction cache to speed up executable instruction fetch, a data cache to speed up data fetch and store, and a translation lookaside buffer (TLB) used to speed up virtual-to-physical address translation for both executable instructions and data. The data cache is usually organized as a hierarchy of one or more cache levels. Data is transferred between memory 114 and cache in blocks of fixed size, called cache lines. When a cache line is copied from memory 114 into the cache, a cache entry is created. The cache entry will include the copied data as well as the requested memory 114 location (now called a tag). When the processor 100 needs to read or write a location in memory 114, it first checks for a corresponding entry in the cache. The cache checks for the contents of the requested memory 114 location in any cache lines that might contain that address. If the processor 100 finds that the memory 114 location is in the cache, a cache hit has occurred. However, if the processor 100 does not find the memory 114 location in the cache, a cache miss has occurred. In the case of a cache hit, the processor 100 immediately reads or writes the data in the cache line. For a cache miss, the cache allocates a new entry and copies in data from memory 114, then the request is fulfilled from the contents of the cache.

The proportion of accesses that result in a cache hit is known as the hit rate, and can be a measure of the effectiveness of the cache for a given program or algorithm. Read misses delay execution because they require data to be transferred from memory 114, which is much slower than reading from the cache. Write misses may occur with less penalty, since the processor 100 can continue execution while data is copied to memory 114 in the background.

Unaligned data can be a potentially serious performance issue. For best performance data should be aligned as follows in Table 1. Note that Table 1 is just an example that represents typical recommendations and other examples could still apply to processors that have different optimal performance alignment specifics:

TABLE 1

| Alignment Block Size | Alignment Address/Boundary | Alignment Data Size |
| --- | --- | --- |
| 8-bit | At any address | Any size |
| 16-bit | Base address a multiple of two byte word | A multiple of two byte word |
| 32-bit | Base address a multiple of four byte word | A multiple of four byte word |
| 64-bit | Base address a multiple of eight byte word | A multiple of eight byte word |
| 80-bit | Base address a multiple of sixteen byte word | A multiple of sixteen byte word |
| 128-bit | Base address a multiple of sixteen byte word | A multiple of sixteen byte word |

However, in one example, only one alignment block size may be used, such as a multiple of sixteen byte words. In this example, the destination address of each data transaction would then be placed on an address boundary which is multiple of 16 and any data size after padding should be multiple of 16 bytes. Due to typical EFI variable design, the smallest variable is 68 bytes in some examples and accordingly the size of the various obsolete regions and valid regions may also be greater than 68 bytes.

Further, processor 100 cache structures typically have 64-byte cache-line sizes so data moved should be layout optimized where possible to ensure efficient use of the cache-line size. Sometimes the size of the valid variable region is more than 64 bytes apart (as noted, the typical smallest is 68 bytes), with others, less or more. The technique works to re-arrange valid data elements into data structures such that they are close together and are more likely to be on the same cache line, which potentially reduces the number of cache misses and the memory footprint loaded into the cache. By having the valid data begin on cache-aligned memory 114 boundaries, memory 114 is prevented from being split across cache-line boundaries, significantly reducing the number of clock cycles to do a memory 114 transfer.

I/O controller 112 provides several different input/output interfaces to allow processor 100 to retrieve or provide information. Several types of I/O channels are shown as non-limiting examples, such as Universal Serial Bus (USB) Ports 124, Asynchronous Transfer Attachment (ATA) Ports 126, and Super I/O 128 which provides conventional serial, parallel, and PS/2 interfaces. I/O controller 112 also has interfaces to slower memory and devices such as a system management bus 122 for interfacing to various system hardware features, Non-Volatile (NV) RAM 130 used for storing BIOS, OS, EFI, hardware and other variables even when the system has been powered off or when various system faults occur which may cause SMRAM and other memory to become corrupt. I/O controller 112 also includes interfaces to slow speed memory holding copies of EFI Firmware 132 and AVRP code copy 134 that is loaded into memory 114 during normal operation, such as during boot-up.

While memory controller 110 and I/O controller 112 are shown as two separate blocks, in some examples the blocks may be combined or alternatively broken into several different blocks. Further, many of the various attached I/O and memory may be integrated onto either the memory controller or I/O controller to provide more integral solutions. Processor 100 may also be combined with the various blocks to create system on a chip (SOC) implementation examples. Storage 122 may be connected to computing device 10 in various possible fashions, such as with Network 118, ATA Ports 126, and USB ports 124. Storage 122 may include one or more copies of AVRP code 116.

The AVRP code 116 may also be described in the general context of non-transitory computer code or machine-useable instructions, including computer-executable instructions such as program modules or logic, being executed by a computer or other machine, such as a personal data assistant or other handheld device. Generally, program modules including routines, programs, objects, components, data structures, etc., refer to code that performs particular tasks or implements particular abstract data types. The AVRP code 116 may be practiced in a variety of system configurations, including handheld devices, consumer electronics, general-purpose computers, more specialty computing devices, etc. They may also be practiced in distributed computing environments where tasks are performed by remote-processing devices that are linked through a communications network.

Again with reference to FIG. 1, computing device 10 includes one or more communication channels or busses that directly or indirectly couples the following devices: memory 114, one or more processors 100, one or more graphics 120 connected to various forms of displays, input/output (I/O) devices 112 (and accordingly USB Ports 124, ATA ports 126, and Super I/O 128), and one or more network or other communication devices 118. Various combinations of the blocks shown may be integrated into common blocks. Accordingly, such is the nature of the art, and FIG. 1 is merely illustrative of an exemplary computing device 10 that can be used in connection with one or more embodiments of the present AVRP. Distinction is not made between such categories as "Workstation," "server," "laptop," "handheld device," etc., as all are contemplated within the scope of FIG. 1 and reference to a "computing device." Computing device 10 typically includes a variety of computer-readable media.

Computer-readable media can be any available non-transitory media that can be accessed by computing device 10 and includes both volatile and nonvolatile media, removable and non-removable media. By way of example, and not limitation, computer-readable media may comprise computer storage media and communication media. Computer storage media include both volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 10. Communication media typically embody transitory computer-readable instructions, data structures, program modules, or other data in a modulated data signal such as a carrier wave or other transport mechanism and include any information delivery media. However, once received, stored, and used, the communication media becomes non-transitory. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

Memory 114 includes computer-storage media in the form of volatile and/or nonvolatile memory, such as AVRP code 116. The memory may be removable, non-removable, or a combination thereof. Exemplary hardware devices include solid-state memory, hard drives, optical-disc drives, etc. Computing device 10 includes one or more processors 100 that read data from various entities such as memory 114 or I/O controller 112. Graphics(s) 120 present data indications to a user or other device. Example display components include a display device, speaker, printing component, vibrating component, etc.

I/O controller 112 allow computing device 10 to be logically coupled to other devices, some of which may be built in. Illustrative components include a keyboard, a mouse, a trackpad, a microphone, joystick, game pad, satellite dish, scanner, printer, wireless device, etc.

Network 118 allows computing device 10 to communicate with other computing devices including datacenter or cloud-based servers through one or more intranet, Internet, private, custom, or other communication channels whether wireless, wired, optical, or other electromagnetic technique.

Figure 2:
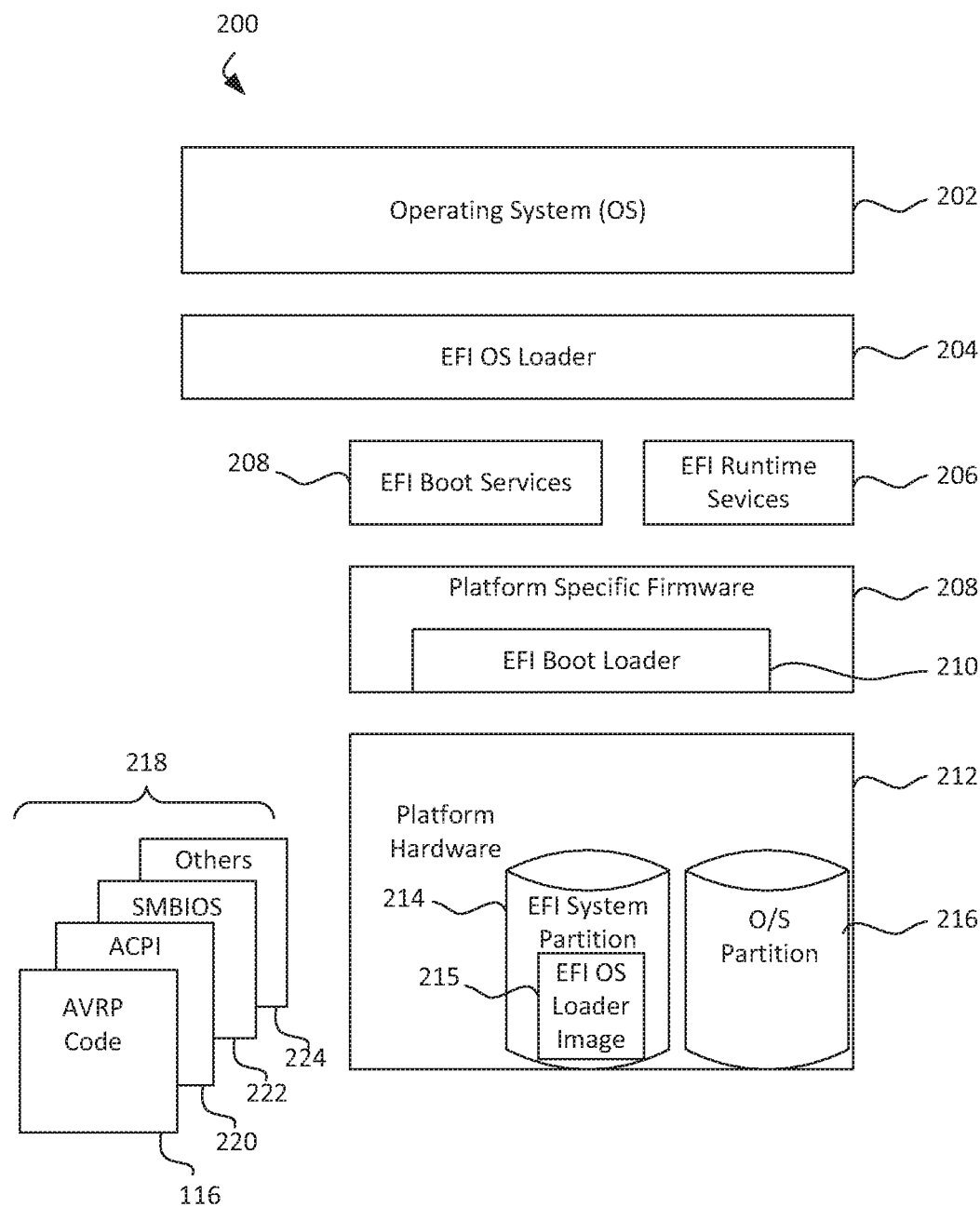
FIG. 2 illustrates the interaction of the various components of an Extensible Firmware Interface (EFI) including AVRP code.

FIG. 2 illustrates the interaction of the various components of an Extensible Firmware Interface (EFI) 200. EFI 200 is a framework for the interface between personal computers or server operating systems and platform firmware. The interface includes data tables that contain platform-related information, boot and run-time service calls that are available to the operating system (OS) 202 and its EFI boot loader 210. Together, these provide a standard environment for booting an operating system 202 and running pre-boot applications such as AVRP code 116. While typically found in Microsoft Windows or Apple based Intel/AMD x86 and x64 systems, EFI is also becoming more prevalent on embedded designs and ARM-based systems.

During an OS 202 boot, the platform firmware is able to retrieve the EFI OS loader image 215 from the EFI System partition 214 located in storage 140 in the platform hardware 212 along with the OS partition 216 using EFI OS Loader 204. The EFI specification allows for a variety of mass storage 140 device types including disk, CD-ROM, DVD, Blu-Ray, as well as remote boot via network 118. Through the EFI extensible protocol interfaces, it is possible to add other boot media types, although these may require EFI OS loader 204 modification.

Once started, the EFI OS loader 204 continues to boot the complete operating system. During the boot, the OS loader 204 may use EFI Boot services 208 and interfaces 218 such as AVRP code 116, ACPI 220, SMBIOS 222, and Others 224 to survey, comprehend, and initialize the various platform components and the OS 202 software that manages them. EFI runtime services 206 are also available to the EFI OS loader 204 during the boot process.

In terms of storage, software asset/management data/images may be stored as firmware variables using extensions to traditional firmware functionality in accordance with the EFI specification. That is, EFI can provide an abstraction for storing persistent data in platform firmware known as "variables." Variables may be defined as key/value pairs that include both identifying information along with attributes (the key), and arbitrary data (the value). Variables can be utilized to store data that may pass between an EFI environment implemented in a platform and EFI OS loaders 204 and other applications that run in the EFI environment, including passing variables to OS run-time entities such as EFI runtime services 206.

Although a particular hardware/firmware implementation of variable storage is not defined in the EFI specification, as noted earlier, there is an open source reference design guide. In some cases, EFI variables are usually expected to be persistent (non-volatile) implying that an EFI implementation on a platform should allow for variables passed in for storage to be retained and available for use each time the system boots, at least until they are explicitly obsoleted by being deleted or overwritten.

In accordance with the EFI specification, a variable service may supply a common/standard interface for data exchange between the OS and system firmware (SFW) (i.e., BIOS). As such, variable services may persist into OS runtime, and therefore, the variable services API can be exposed to the OS, enabling variable data to be added, modified, and deleted by OS actions during OS runtime, in addition to firmware actions during, e.g., pre-boot operations. Generally, variable data may be stored in a system's boot firmware device (BFD), which can be some form of rewritable non-volatile memory (NVRAM 130, EFI Firmware 132, and AVRP code copy 134) component, such as, but not limited to, a flash device or electrically erasable programmable read-only memory (EEPROM). Such non-volatile memory components, generally referred to as non-volatile (NV) rewritable memory devices, can refer to any device capable of storing data in a non-volatile manner (i.e., persisting) when the system is not actually operational, while providing both read and write access to the stored data. Thus, all or a portion of firmware stored on an NV rewritable memory device may be updated by rewriting data to appropriate memory ranges defined for the device access data storage 129 locally or remotely via network 50 or other networks.

Accordingly, a portion of the BFD's (or an auxiliary firmware storage device's) memory space may be reserved for storing persistent data, including variable data. In the case of flash and similar devices, this portion of memory can be referred to as NV random access memory (NVRAM). NVRAM can behave in a manner similar to conventional RAM, except that under flash storage schemes, individual bits may only be toggled in one direction. As a result, in order to reset a toggled bit, groups of bits are "erased" on a block-wise basis.

As discussed above, under EFI, variables are defined as key/value pairs that consist of identifying information plus attributes (the key) and arbitrary data (the value). These key/value pairs may be stored in and accessed from NVRAM via the variable services, which may include three variable service functions: GetVariable; GetNextVariableName; and SetVariable. GetVariable can return the value of a variable. GetNextVariableName can enumerate the current variable names. SetVariable may set the value of a variable. Each of the GetVariable and SetVariable functions may employ five parameters: VariableName, VendorGuid (a unique identifier for the vendor); Attributes (via an attribute mask); DataSize; and Data. The Data parameter can identify a buffer (via a memory address) to write or read the data contents of the variable from. The VariableName and VendorGuid parameters can enable variables corresponding to a particular hardware component (e.g., add-in card) to be easily identified, and enable multiple variables to be attached to the same hardware component.

In particular, and in a typical EFI variable service implementation, EFI variables may be stored in storage continuously such that when an update to an existing EFI variable is made, the existing value is not directly modified. Rather, the existing EFI variable is simply tagged as "DELETED" or "OBSOLETE" in a variable header, while a new EFI variable may then be created, where the new EFI variable may be tagged as "ADDED" or "VALID" in a corresponding variable header. A similar procedure may be utilized to delete an existing EFI variable. That is, an existing EFI variable may be tagged as "DELETED" or "OBSOLETE," while still maintaining the content associated with the EFI variable in storage. Accordingly, and depending on the size/amount of memory available for storage, eventually, enough variable create/delete/update/edit/add actions will result in a need to clear out obsolete variables that are no longer needed/valid, i.e., those obsolete variables that have been tagged as DELETED or OBSOLTE. To clear out the obsolete variables that have been tagged as DELETED or OBSOLETE, a "garbage collection", or Aligned Variable Reclamation Process (AVRP) may be implemented.

It should be noted that "garbage collection" for an EFI variable stored in NVRAM should be performed in a fault tolerant write manner. That is, and in the event that a system crash, e.g., power failure, occurs while "garbage collection" is in progress, no EFI variable data loss or data corruption to the valid region should occur. Additionally, if "garbage collection" is triggered by, e.g., the updating of an existing variable, and a system crash occurs during such "garbage collection", the requested (updated) EFI variable should retain/remain associated with its previous value or updated value after the system recovers from the system crash.

Accordingly, various examples provide a fault tolerant write technique for an EFI platform to perform "garbage collection" of EFI variables on NVRAM storage which need not rely on redundant NVRAM storage space. That is, the need for a large sized NVRAM storage/device is lessened or negated, while also improving "garbage collection" performance.

In many EFI platforms, RAM-type NVRAM storage (e.g., battery-backed SMRAM) is utilized as EFI variable storage. Because RAM-type NVRAM storage has no block-erase limitation, it can be used flexibly like RAM. Various examples within leverage this attribute of RAM-type NVRAM storage by performing "garbage collection" in a fault tolerant write manner.

Figure 3:
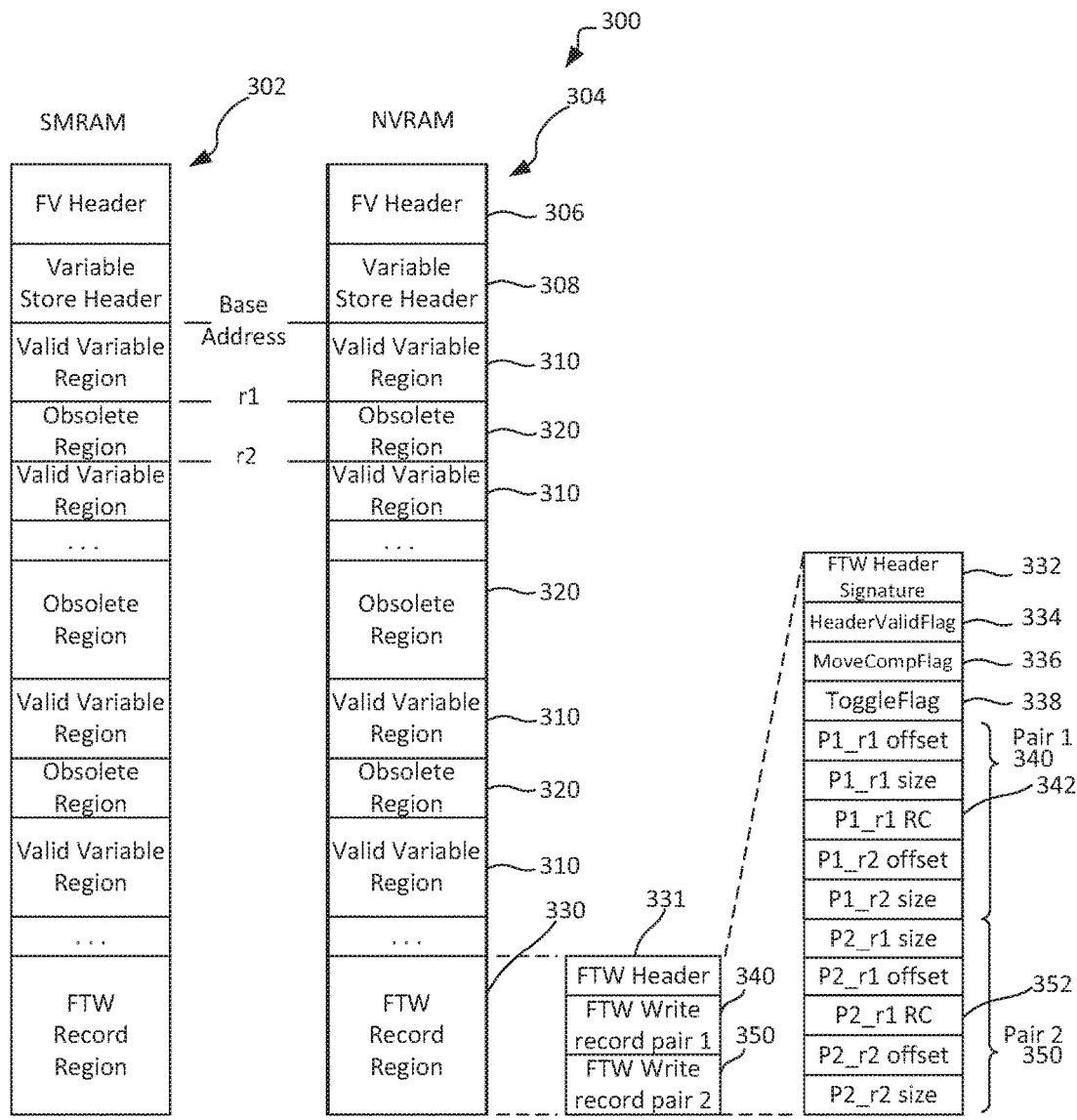
FIG. 3 is an example EFI variable storage implementation using an AVRP technique to reclaim variables in a fault tolerate fashion with NVRAM.

FIG. 3 is an example EFI variable storage 300 implementation using the inventors' AVRP technique to reclaim variables in a fault tolerate fashion with NVRAM. Memory is allocated from SMRAM, part of memory 114, to act as a cache buffer region 302 or a copy of NVRAM variable region 304, including the Flash Transaction Write (FTW) Region 330.

Buffer region 302 has the same content as the NVRAM variable region 304 is accessible in SMM mode and protected from the OS and application programs. Whenever the system firmware (SFW) updates a variable, its writes to both variable regions 302 and 304. The variable regions 302, 304 include a FV header to identify the buffer region 302 and a variable store header which indicates a starting base address of the variable store in the variable regions 302, 304.

The FTW Record region 330 includes a FTW header 331 and two data structures, FTW Write record Pair1 (340) and FTW Write Pair2 (350) for each record pairs, Pair1 and Pair2, respectively. The FTW Header 331 includes a FTW Header signature 332, a HeaderValidFlag 334, a MoveCompFlag 336 and a ToggleFlag 338. The ToggleFlag 338 is used to indicate which Pair1 or Pair2 is currently being used in the ping-pong like implementation. The MoveCompFlag 336 is used to indicate that a move is completed or not. If not completed, then during crash recovery the SFW can check the ToggleFlag 338 to indicate which record pair, Pair1 (340) or Pair2 (350), has the last completed transaction. Each record pair has a r1_offset and r1_size used to indicate the start (from the Base Address of the variable region) and size of an obsolete region that will be "cleaned up" during "garbage collection", and a r2_offset and r2_size used to indicate the start and size of an adjacent valid region which will be copied to the r1_offset location. Alternatively, in some examples rather than be stored, r1_size may just be computed by subtracting the r1_offset from the r2_offset in order to preserve more space in the journal FTW record Region 330. In this improved AVRP technique, each record pair also includes a record counter (P1_r1 RC 342 and P2_r1 RC 352) which is used to keep track of various blocks of moves for Type1 pairs as discussed below in FIG. 6.

Figure 4A:
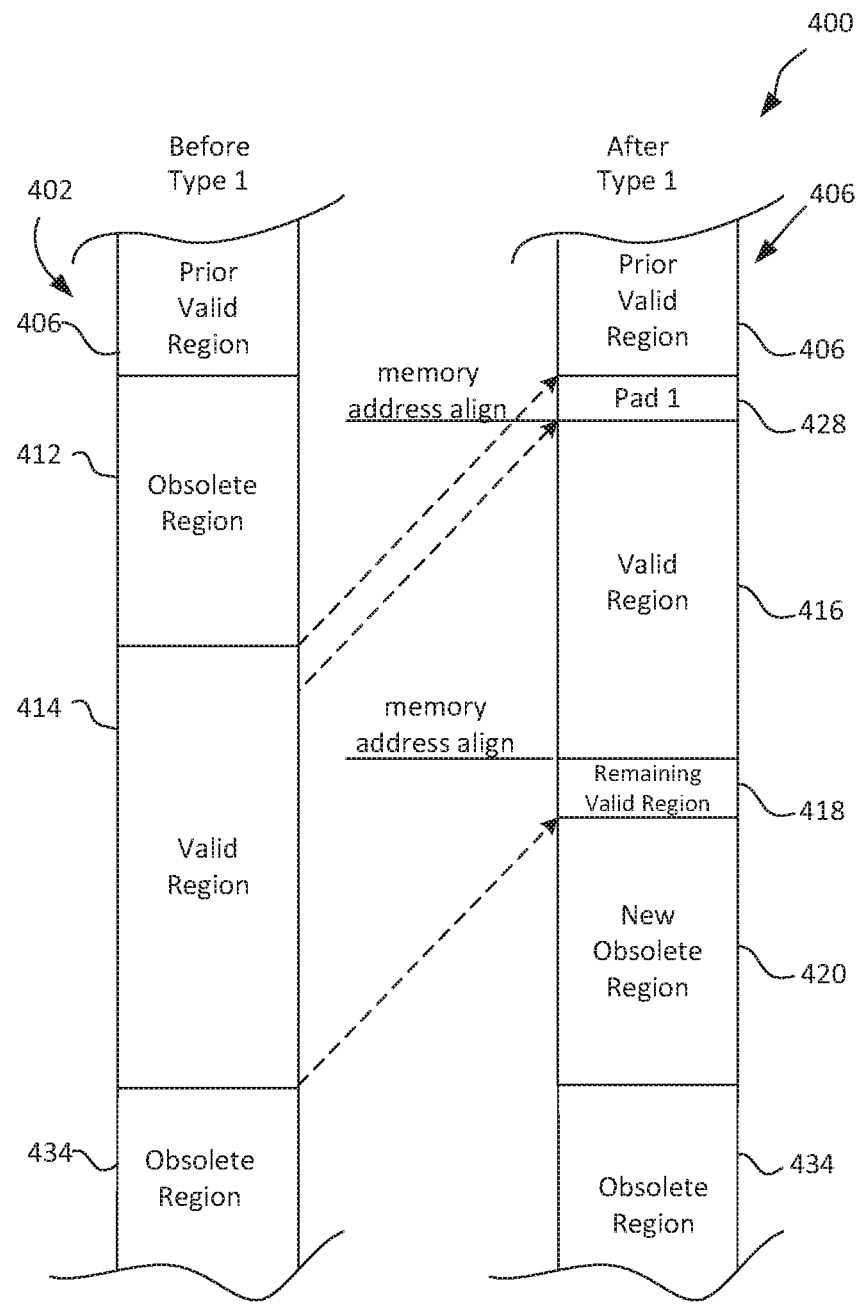
FIGS. 4A and 4B are a set of a couple of compilations of before and after snapshot snippets of variable storage for example pair types.
Figure 4B:
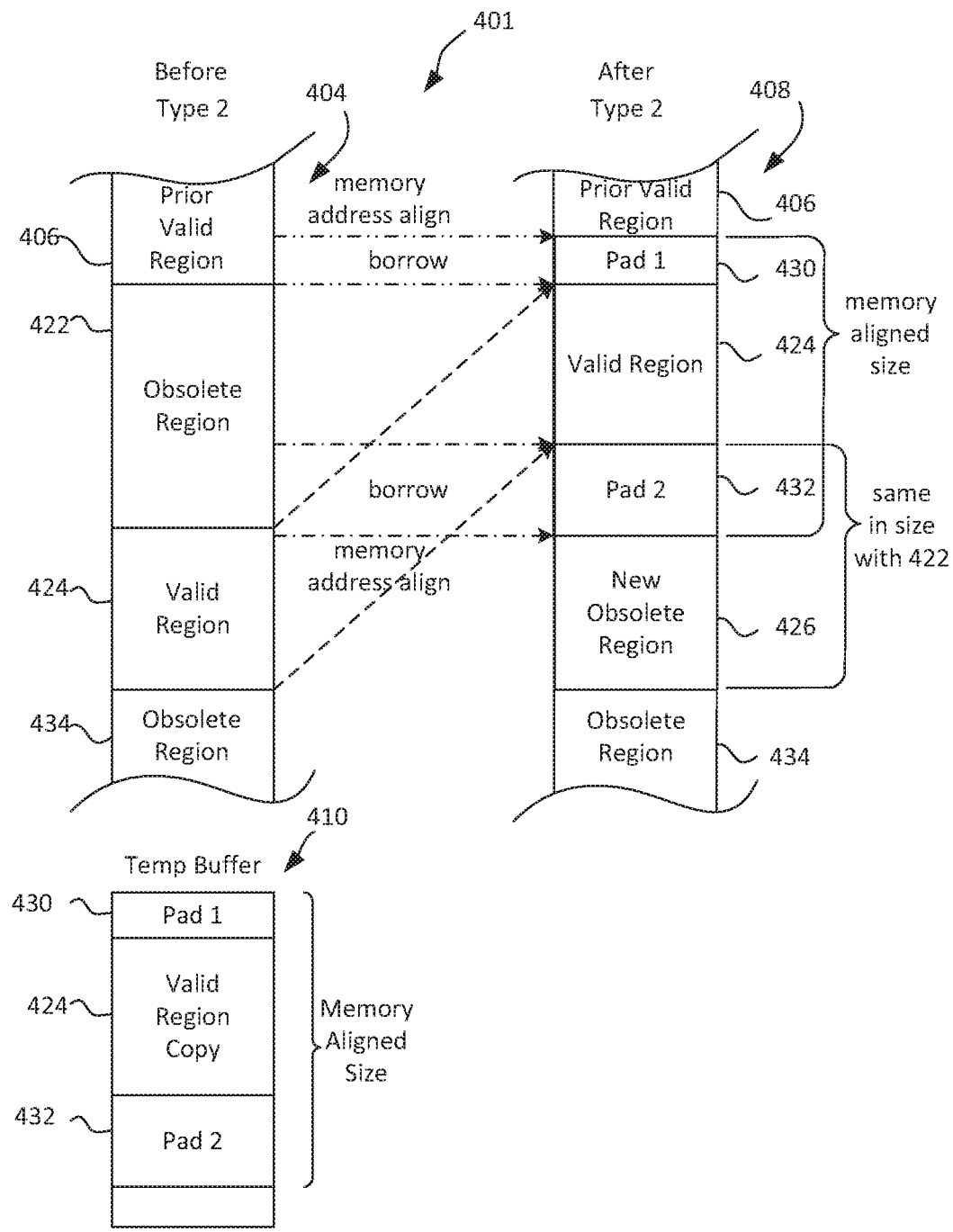
Figure 5:
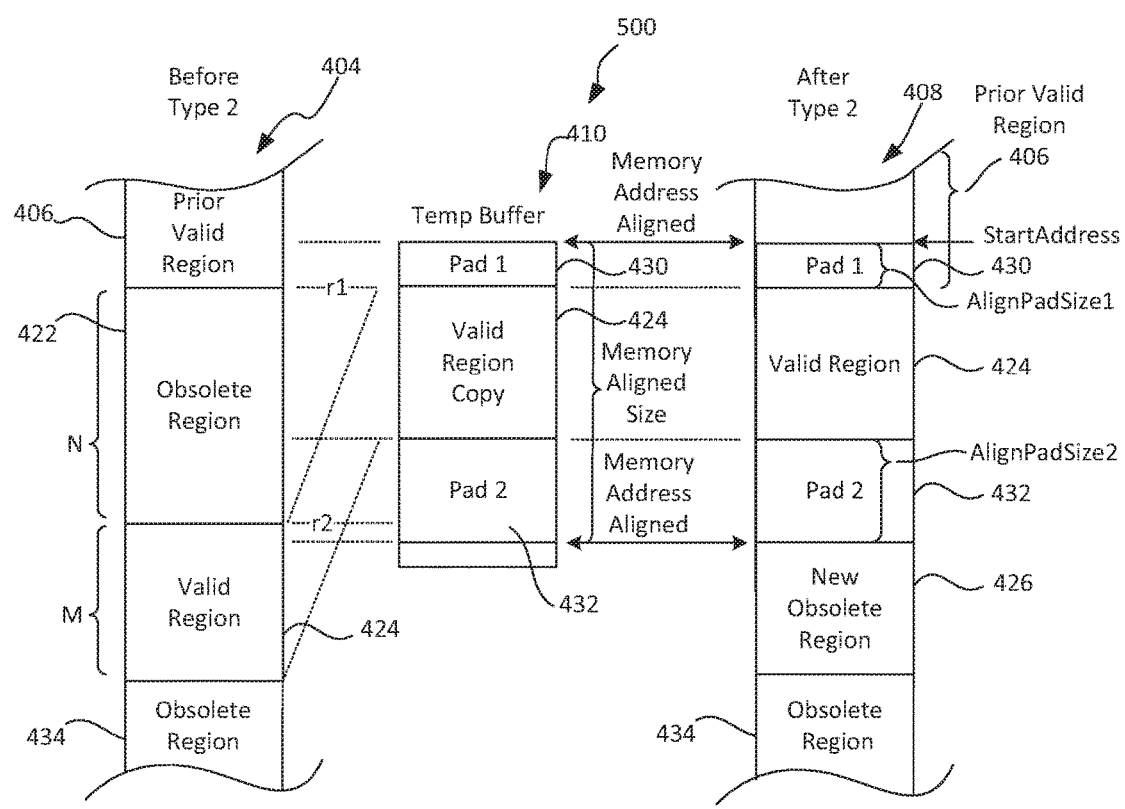
FIG. 5 is a Type2 compilation of buffer memory snippets and a temporary buffer illustrating in more detail the variable reclamation.
Figure 6:
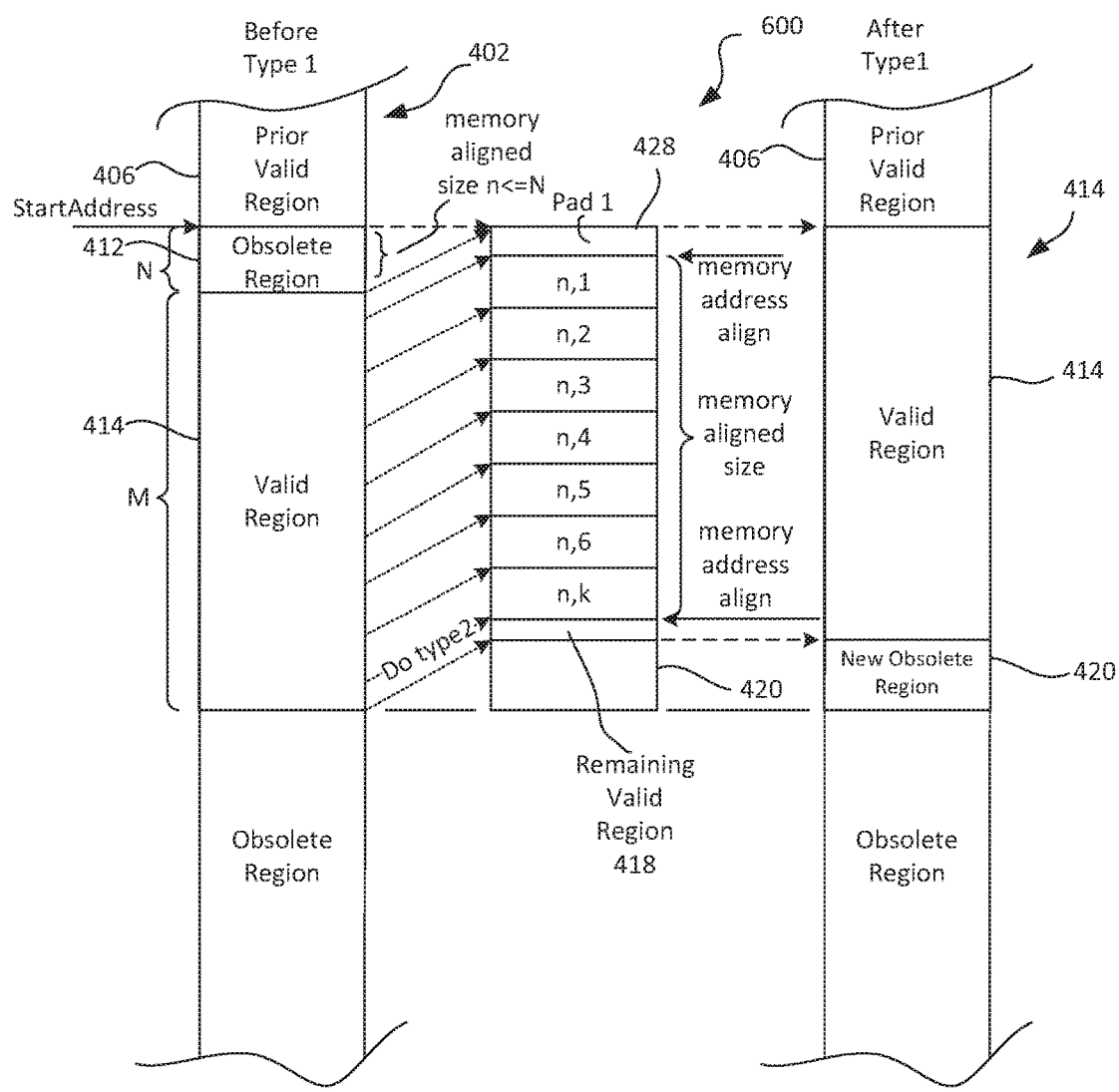
FIG. 6 is an example Type1 pair compilation of snippets of buffer memory.

FIGS. 4A and 4B are a couple of compilations 400, 401 of before and after snapshot snippets of variable storage 300 for example pair types, Type1 and Type2, to illustrate variable reclaiming or "garbage cleanup" using the improved technique before diving into more detail in FIGS. 5-6. Type1 before-snippet 402 includes after prior valid region 406 a Type 1 pair of obsolete region 412 and valid region 414. As it is a Type1 pair, valid region 414 is larger or equal to in size than obsolete region 412. Type2 before snippet 404 includes after prior valid region 406 a Type2 pair of obsolete region 422 and valid region 424. As this set is a Type2 pair, valid region 424 is smaller than obsolete region 422. Also shown for the Type2 pair is a temporary buffer 410 in SMRAM which is used to help in the aligned transfer of valid region 424.

The Type1 after-snippet 406 illustrates the results of the AVRP variable reclamation "garbage cleanup." After the prior region 406 is a small region, "Pad1" 428 which starts at the previous starting address of obsolete region 412. "Pad1" is of a size sufficient such that the address following it is located on a memory aligned boundary. The contents of "Pad1" 428 is the same contents of the valid region 414 from its starting location to the size of "Pad1" 428. "Pad1" 428 is followed by the remaining valid region and a portion of it is noted as "remaining valid region" 418. The size and content of "Pad1" 428, valid region 416, and "remaining valid region" 418 is the same as the valid region 414 in the before Type1-snippet 402. The "Pad1" 428 and "remaining valid region" 418 are transferred differently than the valid region 416 portion as discussed in FIG. 6. After the variable reclaim is complete for a Type1 pair, there is a new obsolete region 420 that can be combined with a following adjacent obsolete region 434 to be reclaimed with a respective valid region following it or if no more valid regions, erased and available for new variable use.

The Type2 after-snippet 408 includes a "Pad1" 430 region with an ending address as the same ending address of the prior valid region 406 in before-snippet 404. The "Pad2" 432 has a starting address that begins in the obsolete region 422 of before Type2 snippet 404. As shown in the temporary buffer 410, the "Pad1" 430 and "Pad2" 432 are added to the beginning and end, respectively, of the valid region 424 such that the length of the temporary buffer with "Pad1" 430, valid region 424, and "Pad2" 432 are memory size aligned and that when copied to the Type2 snippet 408, the start of "Pad1" will be on an aligned memory location. Accordingly, the contents of "Pad1" will be the contents of the prior valid region 406 of the Type2 after-snippet 408 so to prevent corruption of prior valid data 406. The contents of "Pad2" will be the contents of the corresponding Type2 before snippet 404 locations in obsolete region 422 to again not cause data corruption. The start of the valid region 424 is the same location as the start of the obsolete region 422 in the Type2 before-snippet 404. The contents of the valid region 424 is the same contents as the valid region 424 in the Type2 before-snippet 404. After the Type2 variable reclamation is complete, there is a new obsolete region 426 and "Pad2" 432 which can be combined with the next adjacent obsolete region 434 to be paired with a following valid variable region. If there are no more valid variable regions, these can be erased and used for new variables.

Accordingly, obsolete regions can be reclaimed in a NVRAM by searching a memory buffer such as cache buffer region 302 for the obsolete regions and pairing for respective valid regions that neighbor the obsolete regions. The neighboring obsolete regions are determined whether their start addresses are aligned with a starting address of a memory alignment block and if not aligned, writing a small portion of a first valid region in the neighboring obsolete region to the starting address memory alignment block. Any remaining respective valid region is written to the obsolete region beginning at the starting address of the memory alignment block and in multiples of the memory alignment block size. Upon completion of the writing, a moved respective valid region begins at the starting address of the obsolete regions and a new obsolete region begins at an end address of the moved respective valid region.

FIG. 5 is a Type2 compilation 500 of buffer memory 302 snippets and temporary buffer 410 illustrating in more detail the variable reclamation. For a Type2 pair, a size the respective valid region 424 is less or equal to a size the obsolete region 422 and the starting address of the aligned memory block is prior to the starting address of the obsolete region 422, the first valid region is an adjacent valid region 424, and the small portion content for "Pad1" 430 is the content of the adjacent valid region 404 between the starting address of the aligned memory block and the starting address of the obsolete region 422.

After "Pad1" 430 is written to the temporary buffer 410, the contents of the valid region 424 are copies after "Pad1" contents. Then depending on the required memory aligned size, the "Pad2" 432 of the temporary buffer is filled with the respective contents of obsolete region 422 and valid region 424 so as to not change memory contents of NVRAM snippet 408 when the temporary buffer 410 contents are written to the NVRAM snippet 408. Tracking the performance of the writing uses alternating pairs of structure pointers Pair1 340 and Pair2 350, to indicate at least portions of the obsolete 422 and valid 424 regions indicative of from where and to where the valid variables move during the write to allow for recovery of valid regions moved when a system fault occurs.

For a Type2 variable reclaim, the starting address (StartAddress) and size of the obsolete region 422 is stored in a record pair not in use as well as the starting address and size of the valid region 424. The ToggleFlag is updated to indicate that this record pair is now in use and the other not in use. An AlignPadSize1, the size of "Pad1", is determined to make the StartAddress—AlignPadSize1 be memory aligned prior to the start of the obsolete region 422. If "N" is used for the size of the obsolete region 422 and "M" for the size of the valid region 424, then AlignPadSize2 is chosen such that AlignPadSize1+M+ AlignPadSize2 makes the memory aligned size of the temporary buffer end on a memory alignment block. Accordingly, AlignPadSize2 is the size of "Pad2." The contents of "Pad2" comes from two areas:

a) If "M+AlignPadSize 2" is not larger than "N", then the "Pad2" is from the address "StartAddress+M" to "StartAddress+M+AlignPadSize2". The "Pad2" is from one signal area.

b) If "M+AlignPadSize 2" is larger than "N", the "pad2" is from both the obsolete region 422 and the valid region 424, then the "Pad2" is still from the address "StartAddress+M" to "StartAddress+M+AlignPadSize2" but the content is from two different areas.

The temporary buffer 410 in SMRAM has a size of "Pad1" size+M+"Pad2" size. Then the contents of the temporary buffer 410 are copied to the SMRAM and NVRAM starting at "StartAddress—AlignPadSize1" and the copy size is "AlignPadSize1+M+ AlignPadSize2". This copy operation may overwrite the area "StartAddress—AlignPadSize1" to "StartAddress" and "StartAddress+N" to "StartAddress+M+AlignPadSize2." However, since the source content is the same as that being copied, any overwrite will not cause data corruption. After the copy, the appropriate record pair is updated to the size of the valid region 424 and change the ToggleFlag.

If a serious error such as a system crash occurs during the AVRP process then the RecordCounter can be used to recover Type1 data. For instance, if a minor copy of "pad1" occurred, then DataMoved=AlignPadSize+(RecordCounter−1)*n, otherwise, DataMoved=RecordCounter*n. The base addresses and new valid region size should be updated as follows:

Valid region: NewBaseAddress1=OldBaseAddress1+ DataMoved

Obsolete region: NewBaseAddress2=OldBaseAddress2+ DataMoved

Obsolete region size: NewObsoleteSize= OldObsoleteSize=OldBaseAddress1−OldBaseAddress2

Valid region size: NewValidSize=OldValidSize−DataMoved

For Type 2 data, just the current record pair from Journal FTW Record Region 330 can be read and the base address and size used directly.

Also, to further speed up the AVRP technique, since the ToggleFlag and RecordCounter are updated often, for each pair record, they should be positioned in the FTW Record Region 330 on aligned memory boundaries if space is available.

FIG. 6 is an example Type1 pair compilations of snippets 600 of buffer memory 302. For a Type1 pair, a size of the respective valid region 414 is greater than a size of the obsolete region 412. The starting address of the aligned memory block is after the starting address (StartAddress) of the obsolete region 412. The first valid region 414 is the respective valid region, and the small portion content "Pad1" are the contents of the respective valid region 414 between the starting of the respective valid region 414 and a size of the difference between the starting address of the obsolete region 412 and the starting address of the aligned memory block.

Tracking the performance of the write uses alternating pairs of structure pointers to indicate at least portions of the obsolete 412 and valid regions 414 indicative of from where and to where the valid variables move during the writing and each of the alternating pair of structure pointers. The structure pointers include a record counter to allow for recovery of valid regions moved when a system fault occurs. The write of the respective valid region 414 to the neighboring obsolete region 412 is done in clusters of n portions, where n is both aligned and smaller than the size of the neighboring obsolete region, and a respective record counter is updated for each n portion written.

For example, the starting address and size of the obsolete region 412 and valid regions are stored to a record pair that is not in current use. The ToggleFlag is updated to note that the record pair is now in use. The starting address of the obsolete region 412 is checked to see if it is memory aligned and if not, a small portion "Pad1" is created. An AlignPadSize1 is determined to make "StartAddress+AlignPadSize1" be aligned. A minor copy from valid region 414 from Start Address of AlignPadSize is done and the StartAddress of the obsolete region 412 is updated to "StartAddress+AlignPadSize1. The start address of the valid region 414 is also increased by AlignPadSize1. The size of the obsolete region 412 remains the same but the valid region 414 size in the record pair is decreased by AlignPadSize1. The record counter in the record pair is updated to indicate that one move has occurred.

Let the starting address for a move be the start of the valid region in the record pair under use, and the destination address of the move be the start of the obsolete region in the current record pair.

Now that the start of the remaining valid region is memory aligned, let "N" stand for the size of the obsolete region 412 and "M" stand for the initial size of the remaining valid region 414. Now a numeric "n" is determined such that is both memory size aligned and smaller than the size of the obsolete region 412. The value "n" will be determined by the size of the obsolete region 412 and the memory align block size.

Now if the remaining valid region 414 is still larger than the obsolete region 412, then a partial copy of the valid region 414 is copied to the destination address of the copy and the copy size is "n." The starting address for the next copy is updated to the previous starting address+n and the destination address is updated to the previous destination address+n. The valid region 414 size is reduced by n and the current record pair is updated. This copying of "n" size is done until the size of the remaining valid region 418 is less than the size of the obsolete region 412. When that occurs, the size of the remaining valid region 418 should be "M modulo n." If this size is non-zero than a Type2 variable reclaim discussed in FIG. 5 is done to move the remaining valid region 218. This results in final snippet 418 with valid region 414 moved to begin at the original starting address of the obsolete region 412 and of the original size of valid region 414 and a new obsolete region 420 begins at the end of the valid region 414. If other valid regions exist, this can be combined with adjacent obsolete regions used to reclaim any remaining valid regions, else the new obsolete region 420 and adjacent obsolete regions can be erased and used for new variable storage.

Figure 7:
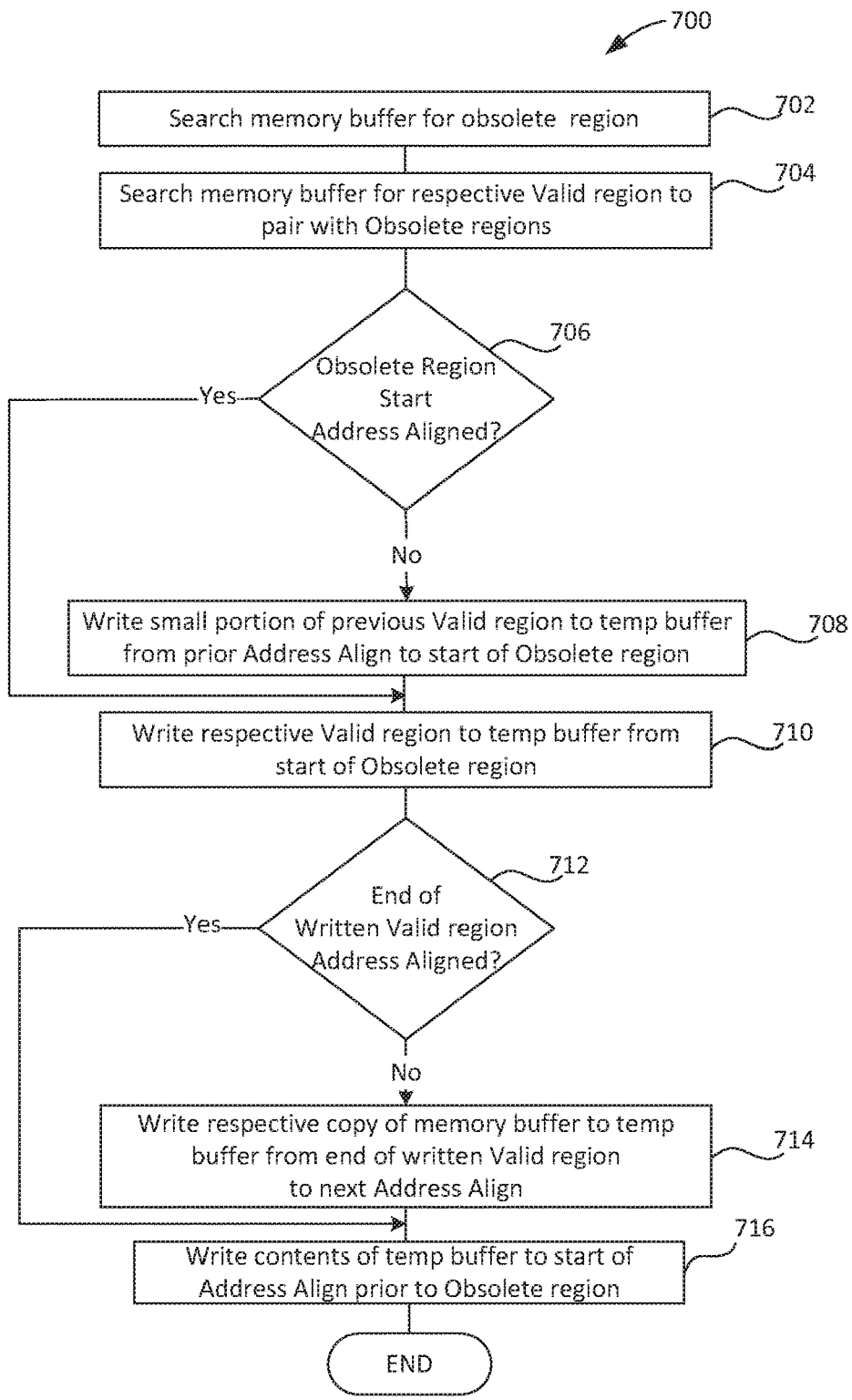
FIG. 7 is an example flow chart of the overall process for the improved AVRP technique with Type2 pairs.

FIG. 7 is an example flow chart 700 of the overall process for the improved AVRP for Type2 pairs. In step 702 a memory buffer is searched to look for an obsolete region. In step 704 the memory buffer is further searched for a respective valid region after the obsolete region and paired with it. The obsolete variable region is checked to see if its start address is memory aligned in decision block 706. If not, in block 708, a small portion of the previous valid region in the memory buffer is written to a temp buffer corresponding from a prior memory address alignment to the start address of the obsolete region in the memory buffer. If from block 706 the memory is aligned or after writing the small portion to have memory alignment, in block 710 the respective valid region in the memory buffer is written into the temp buffer from the start address of the obsolete region. In decision block 712, the end of the written valid region into the obsolete region is checked to see if it ends on a memory address alignment. If not, then in block 714 a respective copy of the memory buffer contents corresponding to the same relative respective addresses is written to the temporary buffer from the end of the previously written valid region to the next memory address alignment. In block 716, the contents of the temp buffer is then written from start of the address alignment prior to the start of the obsolete region to the other memory, resulting in a move of data that is both address aligned and memory sized aligned. During a Type 2 move, the temp buffer is used to store the small portion of the previous valid region, the contents of the respective valid region, and the respective copy of the memory buffer in order to speed up performance. For instance, copying data from the SMRAM buffer memory to an SMRAM temp buffer is very fast and the time is minimal. The data from the SMRAM temp buffer to the NVRAM is copied with both the destination address aligned and the data size aligned, accordingly using less clock cycles than otherwise. When there are thousands of such copies being done during a typical "garbage collection" with the new AVRP technique, there is considerable improvement over prior approaches.

Figure 8:
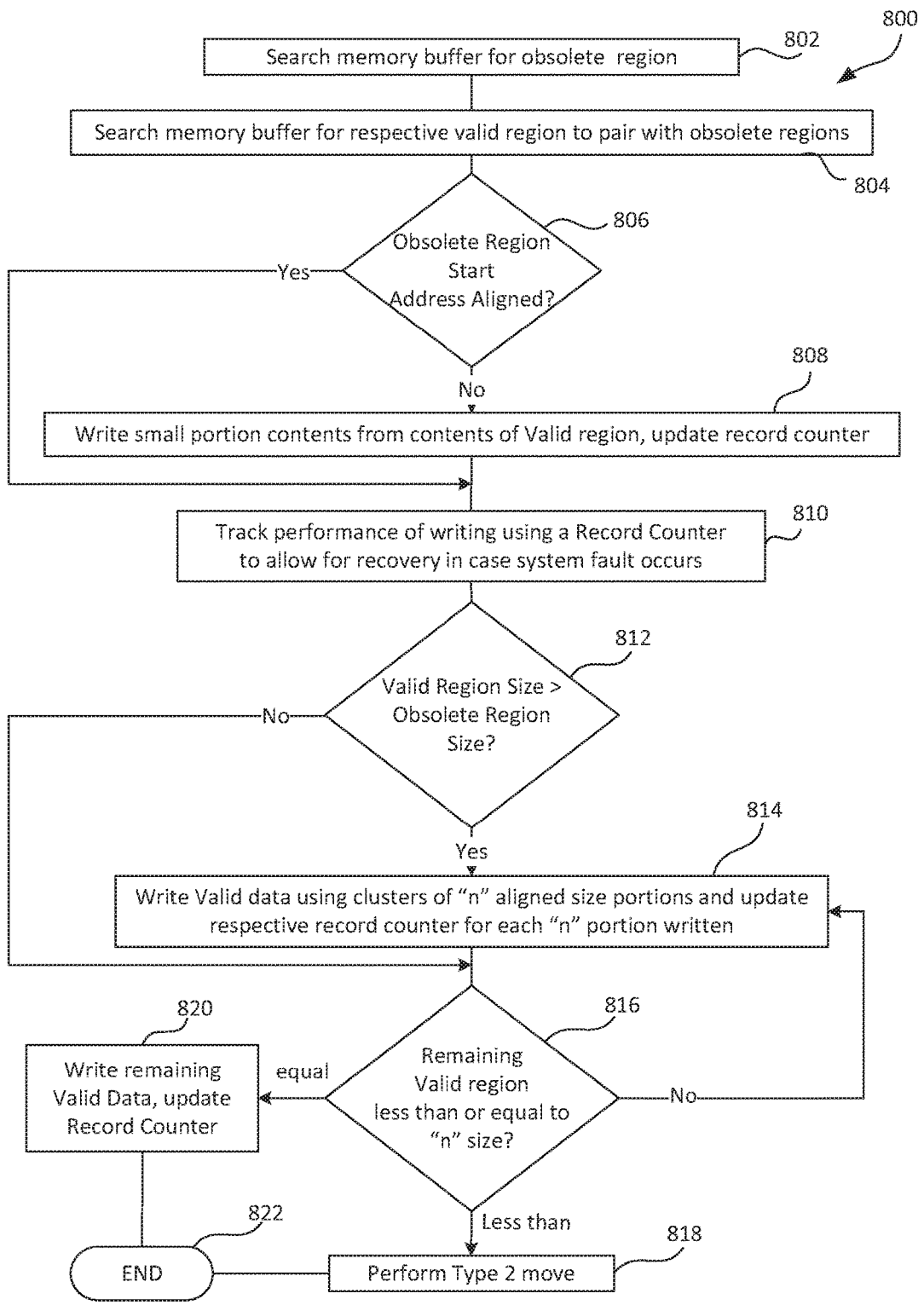
FIG. 8 is an example flow chart of the overall process for the improved AVRP technique with Type1 pairs.

FIG. 8 is an example flow chart of the overall process for the improved AVRP technique with Type1 pairs. In block 802, a memory buffer holding sets of valid and obsolete pairs of variable data is searched for an obsolete region. In block 804, the memory buffer is further searched to find a respective valid region after the obsolete region and paired with it. In decision block 806, the obsolete region starting address is checked to see if the obsolete region is memory aligned. If not, then in block 808 a small portion of the contents from the respective pair valid region is written from the starting address of the obsolete region to a memory aligned address. After the small portion is moved, a record counter is updated. If the obsolete region was aligned in decision block 806 or after the small portion has been moved to an aligned memory address, in block 810, the performance of writing is tracked using a record counter to allow for recovery in case of a system crash or other fault occurs.

In decision block 812, the valid region size is compared to the obsolete region size and if it is bigger than the valid region is written in block 814 to the obsolete region and valid region in cluster of "n" portions, while updating a record counter for each "n" portion written. The writing in clusters of "n" portions continue until in decision block 816 the remaining valid region size is determined less than or equal to the "n" portion size. If the remaining valid region is less than the "n" size, then the remaining valid region are processed as a Type2 pair in block 818 to finish the move in block 822. If the remaining valid region is equal to the "n" size, that is, it is the last block of "n" moves to perform, then in block 820, the remaining valid region is written and the record counter is updated before completing the move in block 822.

Accordingly, the new AVRP technique for "garbage collection" of EFI variables allows for meeting fault tolerance while using less time to perform the AVRP technique. This speed advantage is important when a particular computer system has critical time requirements such as when system operational recovery from a crash to boot is time sensitive or real-time runtime requirements require time sensitive responses. For Type1 pairs, in one example, the improvement for the "garbage collection" was about 62.1%. For Type2 pairs, the improvement was about 23%. In most cases, the computer system will have various combinations of Type1 and Type2 pairs so the overall improvement will be between about 23% and 62.1%. By achieving this speed improvement through the use of software, significant R&D expenses and production costs are reduced than if a faster hardware design were necessary due to increase NVRAM variable storage requirements.

While the present claimed subject matter has been particularly shown and described with reference to the foregoing examples, those skilled in the art will understand that many variations may be made therein without departing from the spirit and scope of the claimed subject matter as defined in the following claims. This description of the claimed subject matter should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A system comprising:
   a memory organized in aligned memory blocks and to store valid variables in a plurality of valid regions and obsolete variables in a plurality of obsolete regions;
   a buffer region to cache the memory; and
   a controller to perform reclamation of the obsolete regions, the reclamation comprising:
      searching the buffer region for the obsolete regions and pairing with respective valid regions that neighbor the obsolete regions, determining if a start address of an obsolete region is aligned with a start address of an aligned memory block in the memory, if the start address of the obsolete region is not aligned with the start address of the aligned memory block, writing a portion of content of a first valid region to a pad region that is aligned with the start address of the aligned memory block, varying the portion of content of the first valid region that is written to the pad region based on a size of the first valid region and an aligned memory block size;

writing a further valid region beginning from an end of the pad region and in multiples of the aligned memory block size to form a moved valid region in the memory, and wherein upon completion of the writing of the further valid region, the moved valid region begins at the start address of the obsolete region and a new obsolete region follows an end address of the moved valid region;

a journal region to track movement of valid variables within the buffer region utilizing alternating pairs of structure pointers to indicate at least portions of the plurality of valid and obsolete regions indicative of from where and to where the valid variables move during a write event;

wherein the pairing of respective valid regions with neighboring obsolete regions includes determining a first pair type and a second pair type, the first pair type comprising a size of the respective valid region greater than a size of the neighboring obsolete region, the second pair type comprising a size of the respective valid region less than or equal to the size of the neighboring obsolete region, and wherein the record counter is only updated with a first pair type.

2. The system of claim 1, wherein a size of the respective valid region is greater than a size of the obsolete region, and wherein the start address of the aligned memory block is after the start address of the obsolete region, the first valid region is the respective valid region, and the portion of content is the contents of the respective valid region between the start of the respective valid region and a size of the difference between the start address of the obsolete region and the start address of the aligned memory block.

3. The system of claim 1, wherein a size the respective valid region is less or equal to a size the obsolete region, and wherein the start address of the aligned memory block is prior to the start address of the obsolete region, the first valid region is an adjacent valid region, and the portion of content is the content of the adjacent valid region between the start address of the aligned memory block and the start address of the obsolete region.

4. The system of claim 1, wherein the alternating pairs of structure pointers each comprise a record counter to allow for recovery of valid variables moved when a system fault occurs.

5. The system of claim 4 wherein a size of the respective valid region is greater than a size of neighboring obsolete region and the writing of the respective valid region to the neighboring obsolete region is done in clusters of n portions, where n is both a multiple of the aligned memory block size and smaller than the size of the neighboring obsolete region, and a respective record counter is updated for each n portion written.

6. The system of claim 4, wherein the alternating pairs of structure pointers comprise a first pair of structure pointers and a second pair of structure pointers wherein the first pair of structure pointers includes a first pointer associated with a first memory address corresponding to a first obsolete region; and a second pointer associated with a second memory address corresponding to a first valid region and a second region size corresponding to the first valid region, wherein the second pair of structure pointers includes a third pointer associated with a third memory address, and a fourth pointer associated with a fourth memory address, wherein the fourth memory address corresponds to at least a portion of a second valid region and the third memory address corresponds to the second memory address.

7. The system of claim 1, wherein the movement of valid variables and valid regions within the memory buffer identically corresponds to the movement of valid variables and valid regions within the memory and wherein the plurality of valid and obsolete variables stored in the plurality of valid and obsolete regions within the memory buffer is identical to the plurality of valid and obsolete variables stored in the plurality of valid and obsolete regions within the memory subsequent to completion of the reclamation of the plurality of obsolete regions.

8. A method to reclaim obsolete regions of variables in a memory organized in aligned memory blocks, comprising:

searching a memory buffer for the obsolete regions;

searching the memory buffer and pairing for respective valid regions that neighbor the obsolete regions;

determining if the neighboring obsolete regions start addresses are aligned with a starting address of an aligned memory block in the memory and if not aligned, writing a portion of content of a first valid region to the neighboring obsolete region as a pad region that is aligned with the starting address of the aligned memory block;

varying the portion of content of the first valid region that is written to the pad region based on a size of the first valid region and an aligned memory block size;

writing any remaining valid region, other than the pad region, to the obsolete region beginning at the starting address of the aligned memory block and in multiples of the aligned memory block size, and wherein upon completion of the writing, a moved valid region begins at the starting address of the obsolete region and a new obsolete region begins at an end address of the moved valid region;

tracking the performance of the writing using alternating pairs of structure pointers to indicate at least portions of the obsolete and valid regions indicative of from where and to where the valid variables move during the writing;

wherein the pairing of respective valid regions with neighboring obsolete regions includes determining a first pair type and a second pair type, the first pair type comprising the respective valid region size greater than a size of the neighboring obsolete region, the second pair type comprising a respective valid regions size less than or equal to the size of the neighboring obsolete region, and wherein the record counter is only updated with a first pair type.

9. The method of claim 8, wherein a size of the respective valid region is greater than a size of the obsolete region, and
wherein the starting address of the aligned memory block is after the starting address of the obsolete region, the first valid region is the respective valid region, and the portion of content is the contents of the respective valid region between the starting of the respective valid region and a size of the difference between the starting address of the obsolete region and the starting address of the aligned memory block.

10. The method of claim 8, wherein a size the respective valid region is less or equal to a size the obsolete region and
wherein the starting address of the aligned memory block is prior to the starting address of the obsolete region, the first valid region is an adjacent valid region, and the portion of content is the content of the adjacent valid region between the starting address of the aligned memory block and the starting address of the obsolete region.

11. The method of claim 8, wherein each of the alternating pair of structure pointers comprising a record counter to allow for recovery of valid regions moved when a system fault occurs.

12. The method of claim 11 wherein a size of the respective valid region is greater than a size of neighboring obsolete region and the writing of the respective valid region to the neighboring obsolete region is done in clusters of n portions, where n is both aligned and smaller than the size of the neighboring obsolete region, and a respective record counter is updated for each n portion written.

13. The method of claim 11, wherein the tracking is recorded on a journal record resident on the memory, the contents of which are cached in the memory buffer, and,
wherein the writing of the valid regions to the obsolete regions identically corresponds to the writing of the valid regions to the obsolete regions within the memory.

14. A non-transitory computer readable memory (CRM) comprising instructions executable by a processor to reclaim obsolete regions of variables on a memory organized in aligned memory blocks, to:
search a memory buffer for the obsolete regions, each having a start address;
search the memory buffer for respective valid regions that neighbor the obsolete regions and to determine if start addresses of the obsolete regions are aligned with a start address of an aligned memory block in the memory and if not aligned,
write a portion of content of a first valid region to a pad region that is aligned with the start address of the aligned memory block;
vary the portion of content of the first valid region that is written to the pad region based on a size of the first valid region and an aligned memory block size; and
write any remaining content of the valid region to the obsolete region beginning at an end of the pad region and in multiples of the aligned memory block size wherein upon completion of the writes, a moved valid region begins at the start address of the obsolete region and a new obsolete region begins at an end address of the moved valid region; and
tracking the performance of the writing using alternating pairs of structure pointers to indicate at least portions of the obsolete and valid regions indicative of from where and to where the valid variables move during the writing;
wherein the pairing of respective valid regions with neighboring obsolete regions includes determining a first pair type and a second pair type, the first pair type comprising the respective valid region size greater than a size of the neighboring obsolete region, the second pair type comprising a respective valid regions size less than or equal to the size of the neighboring obsolete region, and
wherein the record counter is only updated with a first pair type.

15. The CRM of claim 14, wherein a size of the respective valid region is greater than a size of the obsolete region, and
wherein the start address of the aligned memory block is after the start address of the obsolete region, the first valid region is the respective valid region, and the portion of content is the contents of the respective valid region between the start of the respective valid region and a size of the difference between the start address of the obsolete region and the start address of the aligned memory block.

16. The CRM of claim 14, wherein a size the respective valid region is less or equal to a size of the obsolete region and
wherein the start address of the aligned memory block is prior to the start address of the obsolete region, the first valid region is an adjacent valid region, and the portion of content is the content of the adjacent valid region between the start address of the aligned memory block and the start address of the obsolete region.

17. The CRM of claim 16, wherein the alternating pairs of structure pointers each comprising a record counter to allow for recovery of valid region moved when a system fault occurs.

18. The CRM of claim 17 wherein a size of the respective valid region is greater or equal to a size of neighboring obsolete region and the write of the respective valid region to the neighboring obsolete region is done in clusters of n portions, where n is both aligned and smaller than the size of the neighboring obsolete region, and a respective record counter is updated for each n portion written.

* * * * *